United States Patent
Movsesian et al.

(10) Patent No.: US 12,084,164 B2
(45) Date of Patent: Sep. 10, 2024

(54) PRIVACY DOOR FOR AN INTERNAL CABIN OF A VEHICLE

(71) Applicant: THE BOEING COMPANY, Chicago, IL (US)

(72) Inventors: Sami Movsesian, Glendale, CA (US); Steven Hillary Sauer, Spokane, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/966,971

(22) Filed: Oct. 17, 2022

(65) Prior Publication Data
US 2024/0124118 A1   Apr. 18, 2024

(51) Int. Cl.
*B64C 1/14* (2006.01)
*B64D 45/00* (2006.01)

(52) U.S. Cl.
CPC .......... *B64C 1/1469* (2013.01); *B64C 1/1461* (2013.01); *B64D 45/0028* (2019.08)

(58) Field of Classification Search
CPC . B64C 1/1469; B64C 1/1461; B64D 45/0028; B64D 11/00; B64D 45/0026
See application file for complete search history.

(56) References Cited

U.S. PATENT DOCUMENTS

| | | |
|---|---|---|
| 6,568,310 B2 | 5/2003 | Morgan |
| 6,663,046 B2 | 12/2003 | Raczkowski |
| 6,915,986 B2 | 7/2005 | D'Alvia |
| 6,945,497 B2 | 9/2005 | Saku |
| 7,014,148 B2 | 3/2006 | Dominguez |
| 7,441,726 B2 | 10/2008 | Melberg |
| 7,600,716 B2 | 10/2009 | French |
| 8,733,701 B2 | 5/2014 | Erickson |
| 9,114,869 B1 | 8/2015 | Barrett |
| 10,220,933 B2 | 3/2019 | Koch |
| 10,577,074 B2 | 3/2020 | King |
| 10,604,271 B2 * | 3/2020 | Breigenzer ........... B64C 1/1469 |
| 10,661,881 B2 | 5/2020 | Gallagher, Jr. |
| 10,946,948 B2 | 3/2021 | Heidtmann |
| 11,279,461 B2 | 3/2022 | Movsesian |
| 11,292,572 B2 | 4/2022 | Sattayatam |
| 11,305,860 B2 | 4/2022 | Movsesian |

(Continued)

OTHER PUBLICATIONS

Extended European Search Report for EP 23193114.8-1004, dated Dec. 14, 2023.

*Primary Examiner* — Medhat Badawi
*Assistant Examiner* — Vicente Rodriguez
(74) *Attorney, Agent, or Firm* — Joseph M. Butscher; The Small Patent Law Group LLC

(57) ABSTRACT

An internal cabin of a vehicle includes a vehicle control area. A first door is coupled to the vehicle control area. The first door is moveable between a first open position and a first closed position. An aisle extends between the vehicle control area and a passenger seating area. A forward section of the aisle is disposed between a first monument and a second monument. A second door is disposed within the aisle between the first monument and the second monument. The second door is moveable between a second open position and a second closed position. A privacy vestibule is defined between the second door in the second closed position, the first monument, the second monument, and the vehicle control area.

21 Claims, 14 Drawing Sheets

(56) References Cited

U.S. PATENT DOCUMENTS

| | | | |
|---|---|---|---|
| 11,667,396 B2* | 6/2023 | Thayer | B64C 25/68 244/110 R |
| 2003/0052227 A1* | 3/2003 | Pittman | B64D 45/0026 244/118.5 |
| 2003/0066931 A1* | 4/2003 | Ward | B64D 11/04 244/118.5 |
| 2003/0071743 A1* | 4/2003 | Seah | B64D 45/0026 340/945 |
| 2004/0094667 A1* | 5/2004 | D'Alvia | B64D 45/0029 244/118.5 |
| 2005/0116098 A1* | 6/2005 | Martens | B64C 1/1469 244/118.5 |
| 2006/0102788 A1 | 5/2006 | Piorkowski | |
| 2006/0145007 A1* | 7/2006 | Melberg | B64D 45/0028 244/118.5 |
| 2006/0169840 A1* | 8/2006 | French | B64D 45/0028 244/118.5 |
| 2009/0065641 A1* | 3/2009 | Koehn | B64D 11/02 244/129.5 |
| 2010/0288881 A1* | 11/2010 | Helfrich | B64C 1/1469 244/118.6 |
| 2016/0332718 A1 | 11/2016 | Guering | |
| 2020/0115029 A1 | 4/2020 | Movesian | |

* cited by examiner

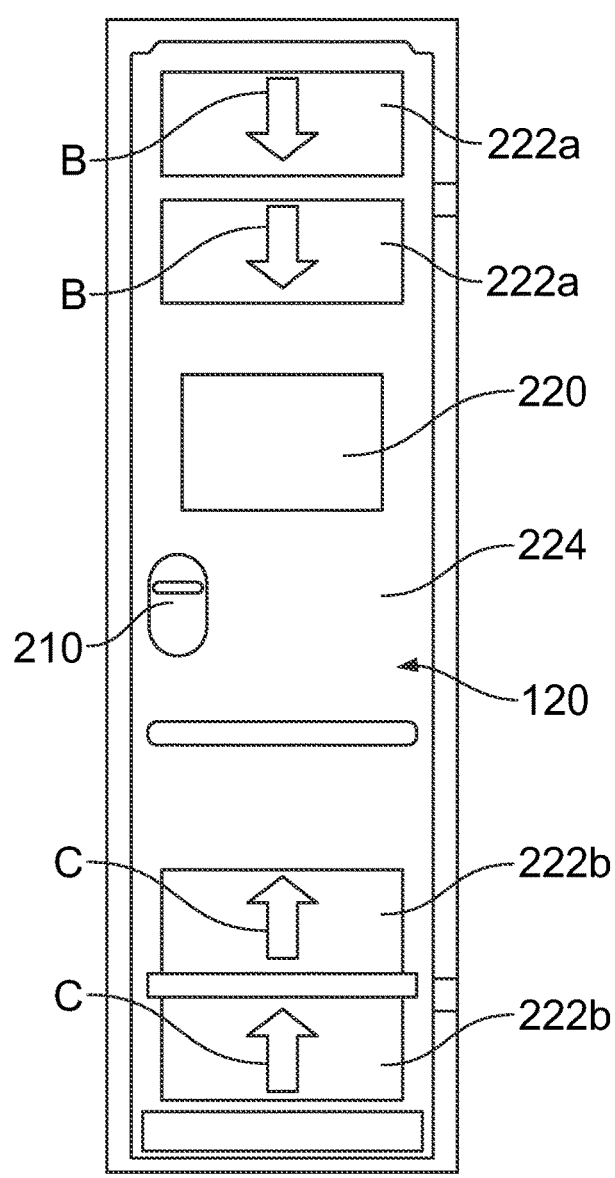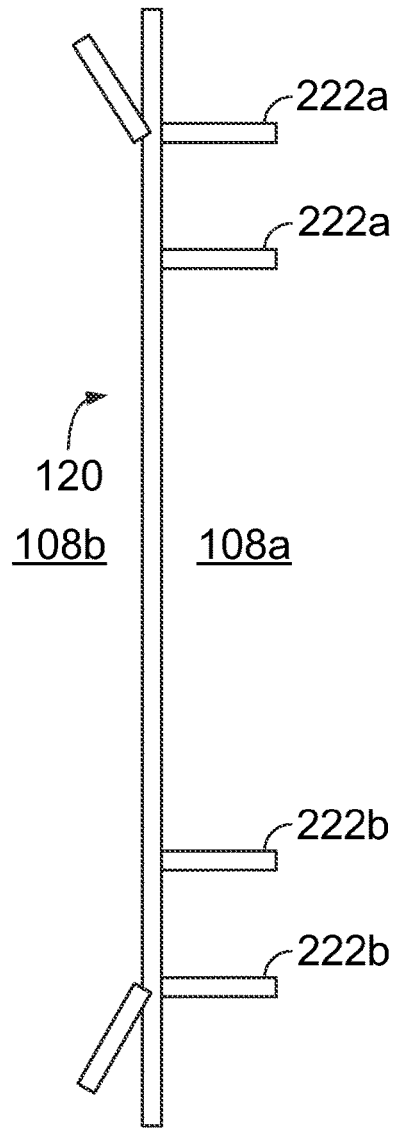
FIG. 15               FIG. 16

PRIVACY DOOR FOR AN INTERNAL CABIN OF A VEHICLE

FIELD OF THE DISCLOSURE

Examples of the subject disclosure generally relate to a privacy door within an internal cabin of a vehicle, such as a commercial aircraft.

BACKGROUND OF THE DISCLOSURE

Aircraft are used to transport passengers and cargo between various locations. Numerous aircraft depart from and arrive at a typical airport every day.

Various commercial aircraft include a door at the entrance of a flight deck. During flight, the door is typically closed and locked while the flight crew operates the aircraft. Certain known aircraft also include a lavatory outside of the flight deck. Passengers and flight crew alike are able to use the lavatory. At certain times during the flight, one or more members of the flight crew may take a break, such as if they need to use the lavatory. During these times, passengers within the internal cabin are typically able to see the members leave the flight deck and enter the lavatory. However, the flight crew may desire additional private space to stretch or take a short rest before returning to the flight deck, for example.

SUMMARY OF THE DISCLOSURE

A need exists for an expanded resting area for flight crew within an internal cabin of an aircraft. Further, a need exists for additional private space within an internal cabin of an aircraft.

With those needs in mind, certain examples of the present disclosure provide an internal cabin of a vehicle including a vehicle control area. A first door is coupled to the vehicle control area. The first door is moveable between a first open position and a first closed position. An aisle extends between the vehicle control area and a passenger seating area. A forward section of the aisle is disposed between a first monument and a second monument. A second door is disposed within the aisle between the first monument and the second monument. The second door is moveable between a second open position and a second closed position. A privacy vestibule is defined between the second door in the second closed position, the first monument, the second monument, and the vehicle control area.

In at least one example, each of the first monument or the second monument is one of a lavatory, a galley, a closet, a crew rest area, or one or more walls.

In at least one example, the privacy vestibule is in front of a rearward section of the aisle that extends into a passenger seating area.

In at least one example, the second door is configured to pivot between the second open position and the second closed position.

The second door can be further moveable into a rearward position that differs from the second open position and the second closed position.

In at least one example, a latch is coupled to one or both of the first monument or the second monument. The latch is configured to couple to a portion of the second door in the second open position to secure the second door in the second open position. In a further example, the second door includes a locking mechanism configured to cooperate with the latch.

In at least one example, a frame is coupled to one or both of the first monument or the second monument. The second door is moveably coupled to the door frame. The frame can be secured to one or more seat tracks. One or both of the second door or the frame can include one or more indicator lights indicating a status of the second door.

In at least one example, the second door includes an access panel configured to be moveable between an access closed position and an access open position. In at least one further example, the second door cannot be moved from the second closed position to the second open position when the access panel is in the access open position.

In at least one example, the second door includes one or more decompression panels moveable between a decompression closed position and a decompression open position. The one or more decompression panels can include one or more latch assemblies including one or more magnets and one or more latch bolts.

Certain examples of the present disclosure provide a method including moving a first door coupled to a vehicle control area between a first open position and a first closed position, wherein an aisle extends between the vehicle control area and a passenger seating area, and wherein a forward section of the aisle is disposed between a first monument and a second monument; and moving a second door within the aisle between a second open position and a second closed position, and wherein a privacy vestibule is defined between the second door in the second closed position, the first monument, the second monument, and the vehicle control area.

Certain examples of the present disclosure provide a privacy door for an internal cabin of a vehicle. The privacy door includes a main body moveably coupled to one or both of a first monument or a second monument. The main body is moveable between an open position and a closed position. The main body in the closed position provides a privacy vestibule between the privacy door, the first monument, the second monument, and a vehicle control area.

The privacy door can also include an access panel configured to be moveable between an access closed position and an access open position, and/or one or more decompression panels moveable between a decompression closed position and a decompression open position.

BRIEF DESCRIPTION OF THE DRAWINGS

FIG. 15 illustrates a front view of the second door, according to an example of the present disclosure.

FIG. 16 illustrates a lateral view of the second door with decompression panels in open positions, according to an example of the present disclosure.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Figure 1:
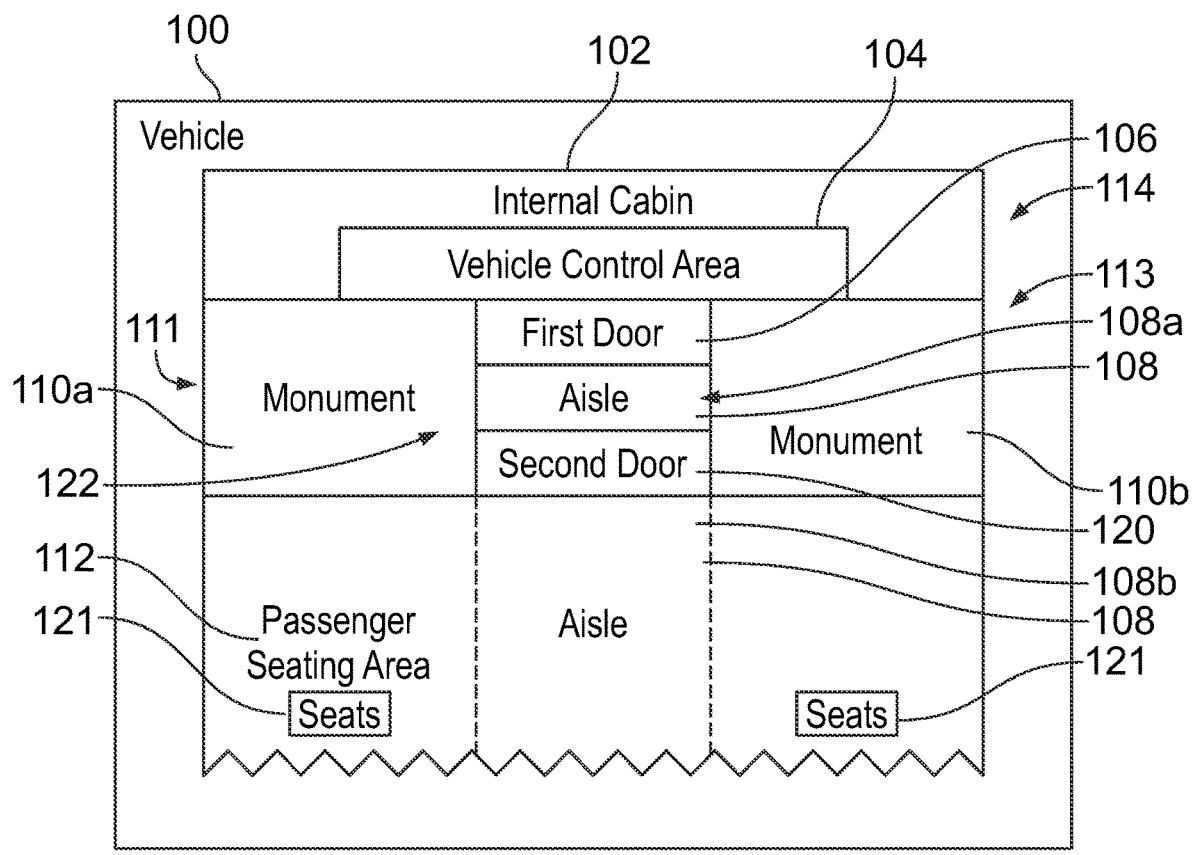
FIG. 1 illustrates a block diagram of a vehicle, according to an example of the present disclosure.

FIG. 1 illustrates a block diagram of a vehicle 100, according to an example of the present disclosure. In at least one example, the vehicle 100 is an aircraft, such as a commercial jet. Other examples of the vehicle 100 include a bus, a van, a watercraft, a spacecraft, or the like.

The vehicle 100 includes an internal cabin 102. A vehicle control area 104 is within the internal cabin 102. For example, the vehicle control area 104 is a flight deck or a cockpit of an aircraft. As another example, the vehicle control area 104 is an operational area within a land-based vehicle, such as a bus or a van. The vehicle control area 104 includes various control devices and systems for controlling operation of the vehicle 100.

A first door 106 is at or within a threshold that leads into the vehicle control area 104. For example, the first door 106 is a main flight deck door of an aircraft. The first door 106 is moveable between an open position and a closed position.

In the open position, the vehicle control area 104 is open to an aisle 108 within the internal cabin 102. In the closed position, the vehicle control area 104 is closed in relation to the aisle 108.

The aisle 108 extends between a first monument 110a on a first side 111 of the internal cabin 102, and a second monument 110b on a second side 113 of the internal cabin 102. The first side 111 is opposite from the second side 113. Examples of the first monument 110a and the second monument 110b include a lavatory, a galley, a closet, a crew rest area, one or more walls, and/or the like.

The aisle 108 extends along a length of the vehicle 100 from the vehicle control area 104, between the first monument 110a and the second monument 110b, and into a passenger seating area 112. The passenger seating area 112 includes a plurality of seats 121 on opposite sides of the aisle 108.

The vehicle control area 104 is at a fore end 114 of the vehicle 100. The vehicle control area 104 is in front of the monuments 110, the aisle 108, and the passenger seating area 112. The passenger seating area 112 is rearward of the vehicle control area 104.

A second door 120 is disposed within the aisle 108 between the first monument 110a and the second monument 110b. The second door 120 is a privacy door that is moveable between an open position and a closed position. In at least one example, the second door 120 is configured to pivotally move about a vertical axis between the open position and the closed position. As another example, the second door 120 is configured to pivotally move about a horizontal axis between the open position and the closed position. As another example, the second door 120 is configured to slide into and out of one or both of a portion (such as a wall) of the first monument 110a and/or the second monument 110b between the open position and the closed position. As another example, the second door 120 is configured to slide upwardly and downwardly between the open position and the second position. As another example, the second door 120 is configured to telescope laterally or vertically between the open position and the second position.

When the second door 120 is in the open position, the first door 106 is accessible and viewable from the passenger seating area 112, for example. In contrast, when the second door 120 is in the closed position, a privacy vestibule 122 is formed between the vehicle control area 104, the first monument 110a, the second monument 110b, and the closed second door 120. The privacy vestibule 122 includes a forward section 108a of the aisle 108 that is in front of a rearward section 108b of the aisle 108 that extends into the passenger seating area 112. In this manner, the second door 120 can be closed to provide the privacy vestibule 122.

As described herein, the internal cabin 102 of the vehicle 100 includes the vehicle control area 104. The first door 106 is coupled to the vehicle control area 104 (such as moveably secured to a door frame of the vehicle control area 104). The first door 106 is moveable between an open position and a closed position. The aisle 108 extends between the vehicle control area 104 and the passenger seating area 112. The forward section 108a of the aisle 108 is disposed between the first monument 110a and the second monument 110b. The second door 120 disposed within the aisle 108 between the first monument 110a and the second monument 110b. The second door 120 can be coupled to one or both of the first monument 110 and/or the second monument 110b, such as through a door frame. The second door 120 is moveable between an open position and a closed position. The privacy vestibule 122 is defined between the second door 120 in the closed position, the first monument 110a, the second monument 110b, and the vehicle control area 104.

Figure 2:
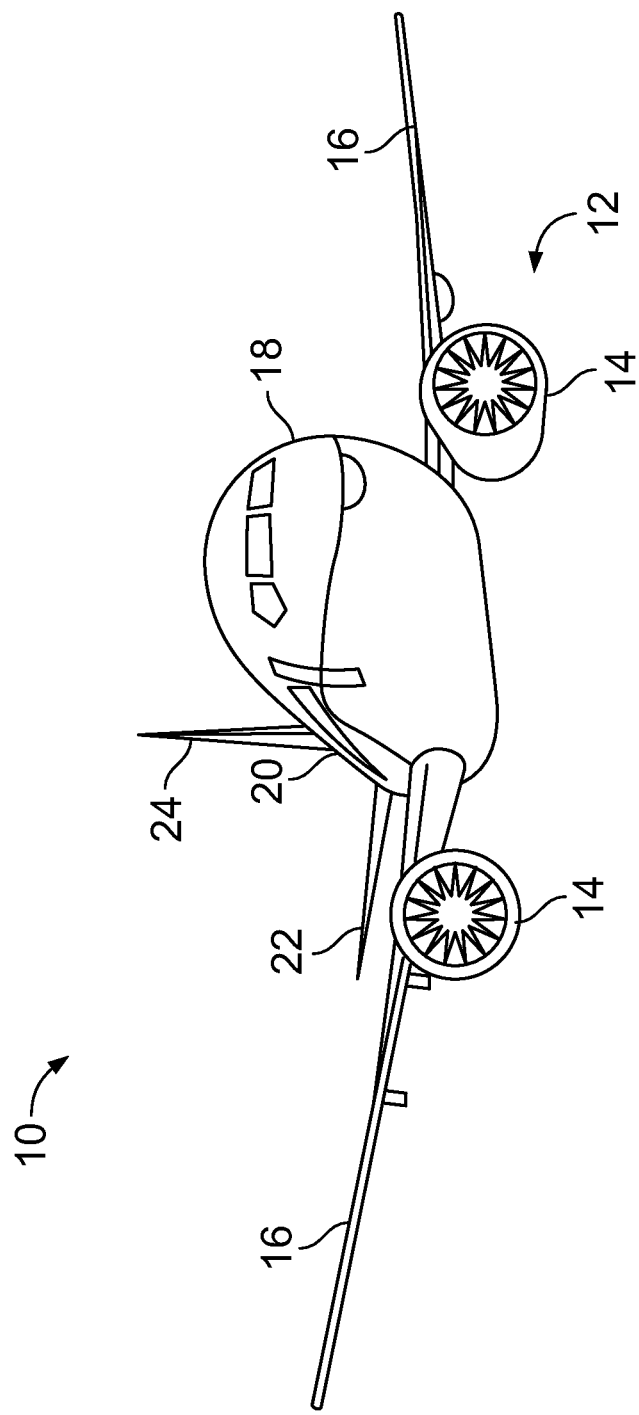
FIG. 2 illustrates a perspective front view of an aircraft, according to an example of the present disclosure.

FIG. 2 illustrates a perspective top view of an aircraft 10, according to an example of the present disclosure. The aircraft 10 is an example of the vehicle 100 shown in FIG. 1. The aircraft 10 includes a propulsion system 12 that can include two engines 14, for example. Optionally, the propulsion system 12 can include more engines 14 than shown. The engines 14 are carried by wings 16 of the aircraft 10. In other examples, the engines 14 can be carried by a fuselage 18 and/or an empennage 20. The empennage 20 may also support horizontal stabilizers 22 and a vertical stabilizer 24.

The fuselage 18 of the aircraft 10 defines an internal cabin (such as the internal cabin 102 shown and described with respect to FIG. 1), which may be defined by interior sidewall panels that connect to a ceiling and a floor. The aircraft 10 shown in FIG. 2 is merely an example. The aircraft 10 can be sized, shaped, and configured differently than shown. Optionally, instead of an aircraft, examples of the present disclosure may be used with various other vehicles, such as automobiles, buses, locomotives and train cars, seacraft, spacecraft, and the like.

Figure 3A:
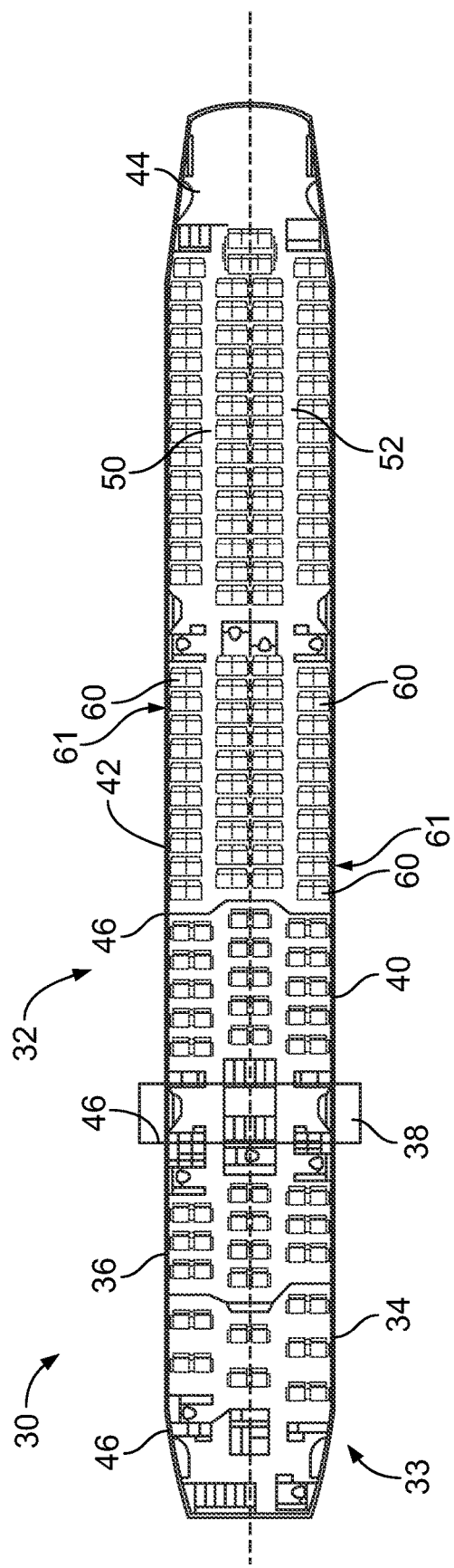
FIG. 3A illustrates a top plan view of an internal cabin of an aircraft, according to an example of the present disclosure.

FIG. 3A illustrates a top plan view of an internal cabin 30 of an aircraft, according to an example of the present disclosure. The internal cabin 30 shown in FIG. 3A is an example of the internal cabin 102 shown in FIG. 1. The internal cabin 30 may be within a fuselage 32 of the aircraft. For example, one or more fuselage walls may define an interior of the internal cabin 30. The interior of the internal cabin 30 is defined by sidewall panels that connect to a ceiling and a floor. The sidewall panels include lateral segments that connect to ceiling segments. The lateral segments define lateral wall portions, while the ceiling segments define at least portions of the ceiling within the internal cabin 30.

The internal cabin 30 includes multiple sections, including a front section 33, a first class section 34, a business class section 36, a front galley station 38, an expanded economy or coach section 40, a standard economy or coach section 42, and an aft section 44, which may include multiple lavatories and galley stations. It is to be understood that the internal cabin 30 may include more or less sections than shown. For example, the internal cabin 30 may not include a first class section, and may include more or less galley stations than shown. Each of the sections may be separated by a cabin transition area 46.

As shown in FIG. 3A, the internal cabin 30 includes two aisles 50 and 52 that lead to the aft section 44. Optionally, the internal cabin 30 may have less or more aisles than shown. For example, the internal cabin 30 may include a single aisle that extends through the center of the internal cabin 30 that leads to the aft section 44.

Seat assemblies 60 are positioned throughout the internal cabin 30 within the passenger seating area. The seat assemblies 60 may be arranged in rows 61.

Figure 3B:
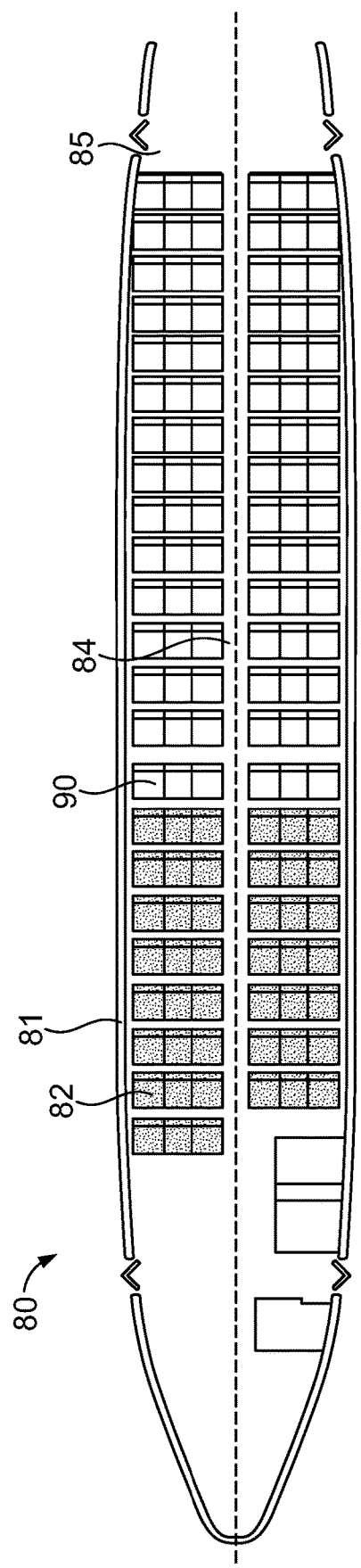
FIG. 3B illustrates a top plan view of an internal cabin of an aircraft, according to an example of the present disclosure.

FIG. 3B illustrates a top plan view of an internal cabin 80 of an aircraft, according to an example of the present disclosure. The internal cabin 80 is an example of the internal cabin 102 shown in FIG. 1. The internal cabin 80 may be within a fuselage 81 of the aircraft. For example, one or more fuselage walls may define the interior of the internal cabin 80. The internal cabin 80 includes multiple sections, including a main cabin 82 having passenger seat assemblies 90 within a passenger seating area, and an aft section 85 behind the main cabin 82. It is to be understood that the internal cabin 80 may include more or less sections than shown.

The internal cabin 80 may include a single aisle 84 that leads to the aft section 85. The single aisle 84 may extend through the center of the internal cabin 80 that leads to the aft section 85. For example, the single aisle 84 may be coaxially aligned with a central longitudinal plane of the internal cabin 80.

Figure 4:
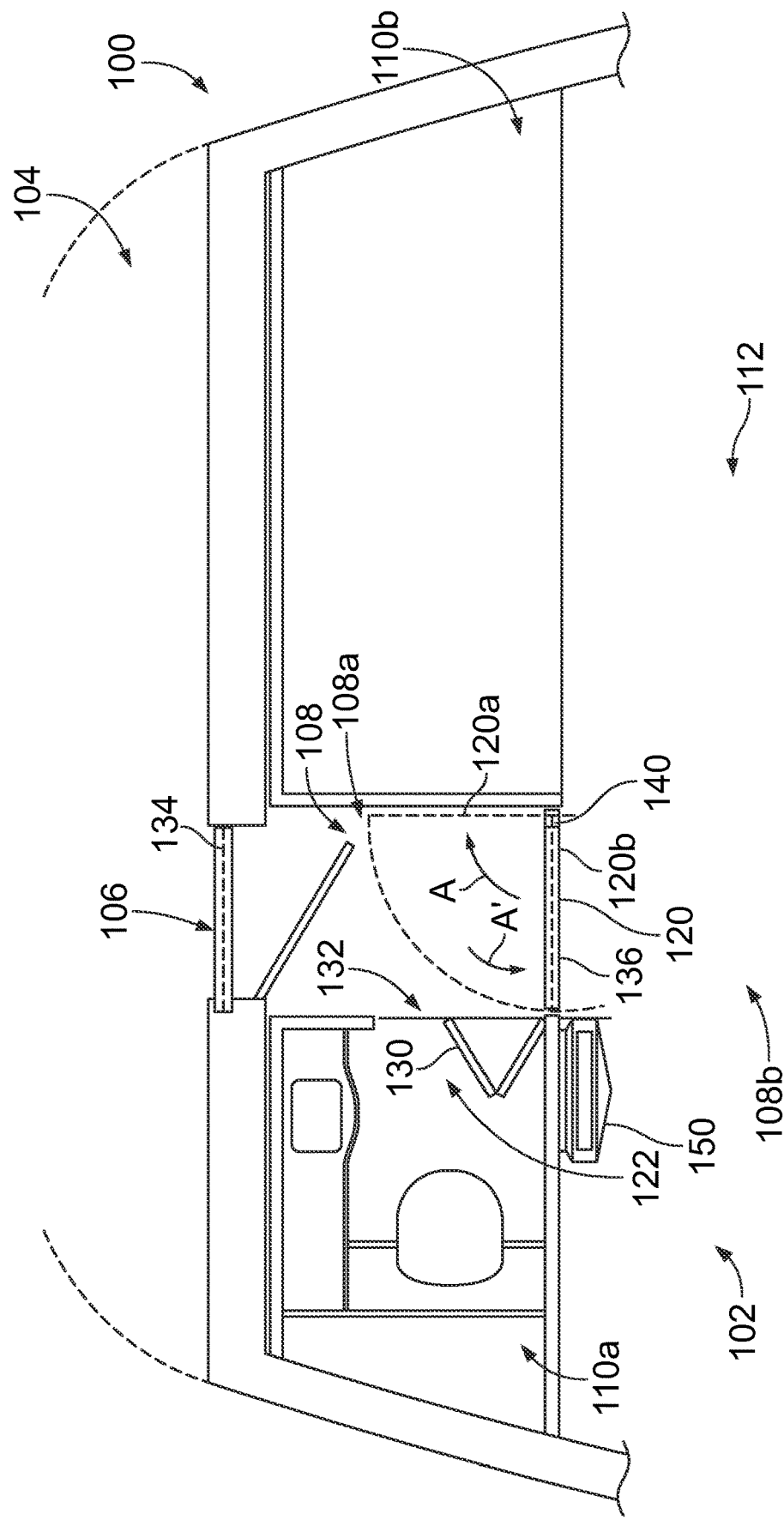
FIG. 4 illustrates a top plan view of a forward section of an internal cabin of a vehicle, according to an example of the present disclosure.

FIG. 4 illustrates a top plan view of a forward section of an internal cabin 102 of a vehicle 100, according to an example of the present disclosure. The forward section of the internal cabin 102 includes the vehicle control area 104, the first monument 110a, the second monument 110b, and is in front of the passenger seating area 112. As shown, the first monument 110b can be a lavatory having a door 130 configured to be moved between open and closed position. The door 130 is within a threshold 132 (that leads into the lavatory) that is longitudinally aligned with the aisle 108. As shown, the threshold 132 is orthogonal (such as perpendicular) to a threshold 134 (in which the first door 106 in the closed position resides) of the vehicle control area 104. The threshold 132 is also orthogonal to a threshold 136 (in which the second door 120 in the closed position resides) of the privacy vestibule 122.

The second monument 110b can be a galley, for example. Optionally, the first monument 110a can be a galley, and the second monument 110b can be a lavatory. As another example, both the first monument 110a and the second monument 110b can be lavatories. As another example, both the first monument 110a and the second monument 110b can be galleys. As another example, one or both of the first monument 110a or the second monument 110b can be a closet, a walled-section, or the like.

In at least one example, the second door (that is, the privacy door) 120 is configured to pivot open and closed about a pivot axis 140, which can be vertically oriented in relation to the internal cabin 102. The second door 120 pivots open in the direction of arc A into the open position 120a, in which the privacy vestibule 122 is open to the passenger seating area 112 via the aisle 108. The second door 120 pivots from the open position 120a to the closed position 120b in the direction of arc A' to close the privacy vestibule 122. When the second door 120 is in the closed position 120b, the privacy vestibule 122 is closed off from the passenger seating area 112.

As shown, at least one attendant seat 150 can be secured to a monument 110a or 110b. For example, an attendant seat 150 is a foldable seat secured to an outer wall of the first monument 110a, and faces the passenger seating area 112. As another example, an attendant seat 150 can be disposed within a monument, such as when one of the monuments 110a or 110b is a crew rest area. Optionally, an attendant seat may not be secured to either the first monument 110a or the second monument 110b.

Figure 5:
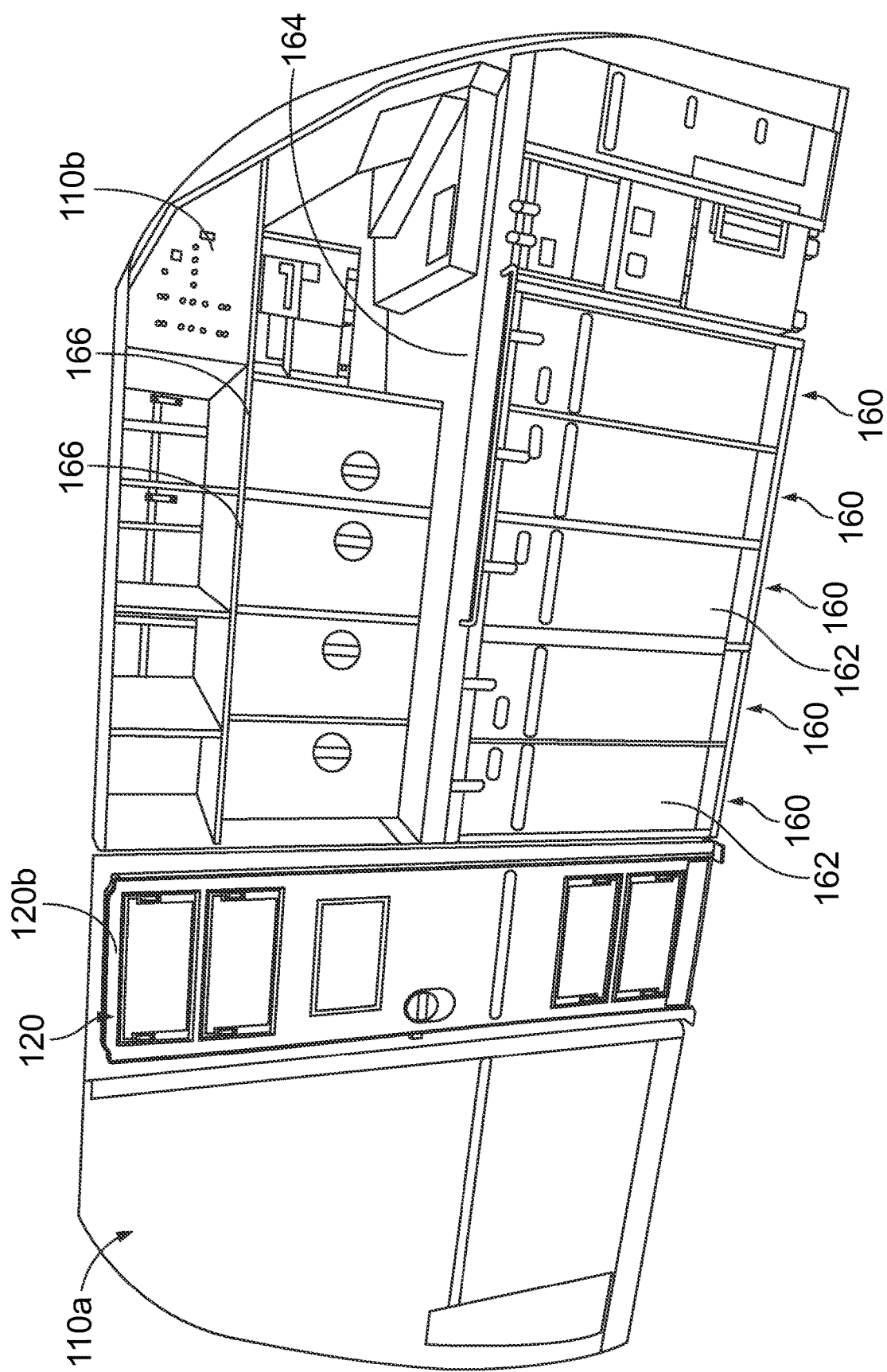
FIG. 5 illustrates an isometric rear view of a second door in a closed position between a first monument and a second monument, according to an example of the present disclosure.

FIG. 5 illustrates an isometric rear view of the second door 120 in the closed position 120b between the first monument 110a and the second monument 110b, according to an example of the present disclosure. The first monument 110a can be a lavatory, and the second monument 110b can be a galley including a plurality of storage compartments 160 for galley carts 162, one or more countertops 164, one or more cabinets 166, and/or the like.

Figure 6:
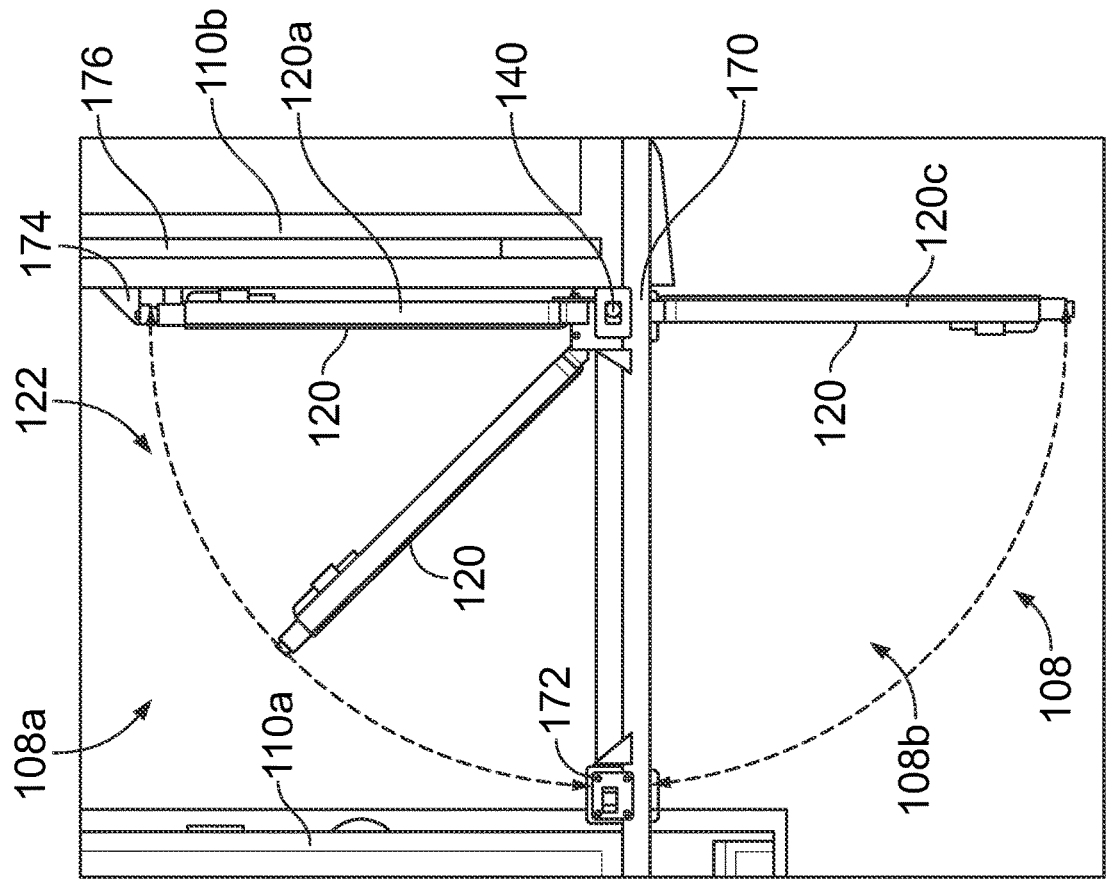
FIG. 6 illustrates a top view of the second door coupled to a frame, according to an example of the present disclosure.

FIG. 6 illustrates a top view of the second door 120 coupled to a frame 170, according to an example of the present disclosure. The second door 120 is pivotally coupled to the frame 170 via the pivot axis 140. A first latch 172 is secured to one or both of the frame 170 and/or the first monument 110a and is configured to secure the second door 120 in the closed position. A second latch 174 can be secured to a lateral wall 176 (facing the forward section 108a of the aisle 108) of the second monument 110b and is configured to secure the second door 120 in the open position.

In at least one example, the second door 120 is also configured to open rearwardly into the rearward section 108b of the aisle 108 into a rearward position 120c. The rearward position 120c differs from the open position 120a and the closed position 120b. The rearward position 120c is not between the open position 120a and the closed position 120b. Instead, in at least one example, the rearward position 120c is past the closed position 120a, opposite from the open position 120a (such as 180 degrees opposite from the open position 120a). In the rearward position 120c, the second door 120 is outside of the privacy vestibule 122. As shown, the second door 120 in the rearward position 120c is 180 degrees opposite from the second door 120 in the open position 120a. In this manner, the second door 120 can be configured to rotate 180 degrees (or substantially 180 degrees, such as within +/−5 degrees) between the open position 120a and the rearward position 120c. The rearward position 120c can be used in a situation in which large components are being moved into or out of the privacy vestibule 122 and/or the vehicle control area 104, and additional clearance space is needed. Optionally, the second door 120 may not be movable into the rearward position 120c. Instead, the second door 120 may be moveable only between the closed position 120a and the open position 120b.

Figure 7:
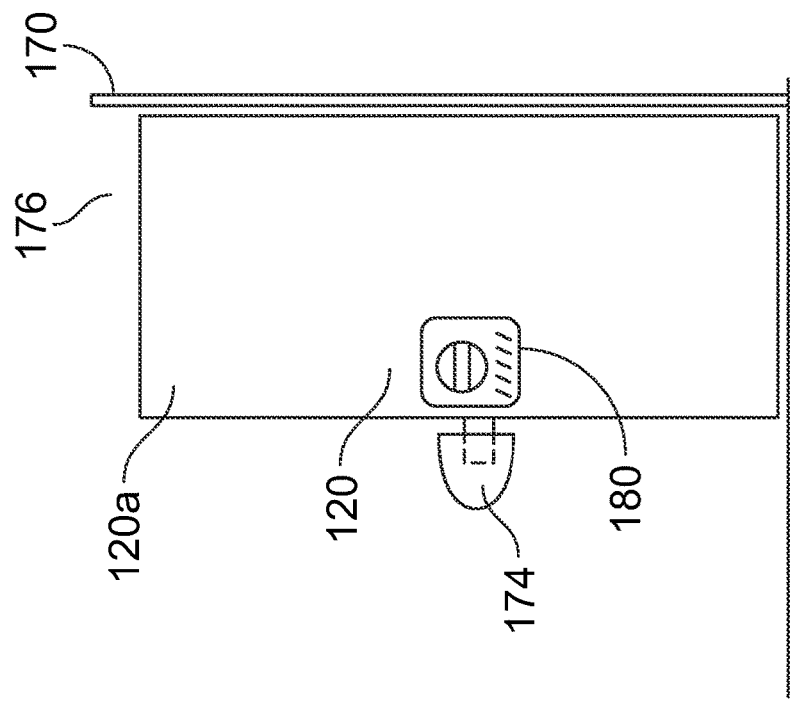
FIG. 7 illustrates a lateral view of the second door in an open position, according to example of the present disclosure.

FIG. 7 illustrates a lateral view of the second door 120 in the open position 120a, according to example of the present disclosure. In at least one example, the latch 174 locks the second door 120 in the open position 120a. A locking mechanism 180 is configured to cooperate with the latch 174 to unlock the second door 120 and allow it to be moved to the closed position. For example, the locking mechanism 180 can be a keying assembly that is configured to receive a key that is operable to unlock the latch 174. As another example, the locking mechanism 180 can be a coded key pad. In this manner, the locking mechanism 180 ensures that the second door 120 remains in the open position 120a and can only be closed by authorized personnel. Alternatively, a locking mechanism may not be within the internal cabin.

Figure 8:
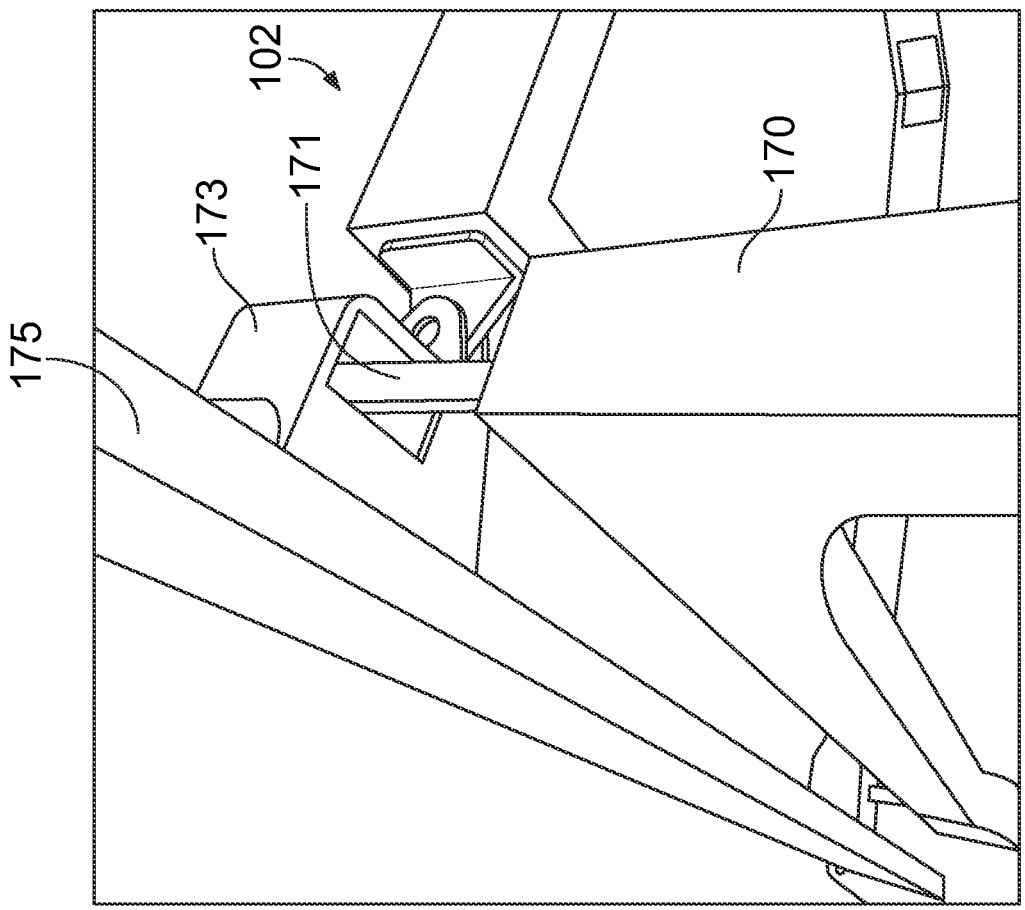
FIG. 8 illustrates an isometric upper front, lateral view of a frame, according to an example of the present disclosure.

FIG. 8 illustrates an isometric upper front, lateral view of the frame 170, according to an example of the present disclosure. The frame 170 is a door frame for the second door 120 (shown in FIGS. 1, 4, 5, 6, and 7). In at least one example, the frame 170 includes spring-loaded pins 171 extending from an upper surface, such as at upper corners. The pins 171 are received and retained by reciprocal fittings 173 of secondary structure 175 (such as a frame, beam, or the like) within the internal cabin 102. Optionally, the frame 170 can be integrally molded and formed with the secondary structure 175. As another example, the frame 170 can be secured to the secondary structure 175 through one or more fasteners (such as bolts, screws, or the like), adhesives, and/or the like.

Figure 9:
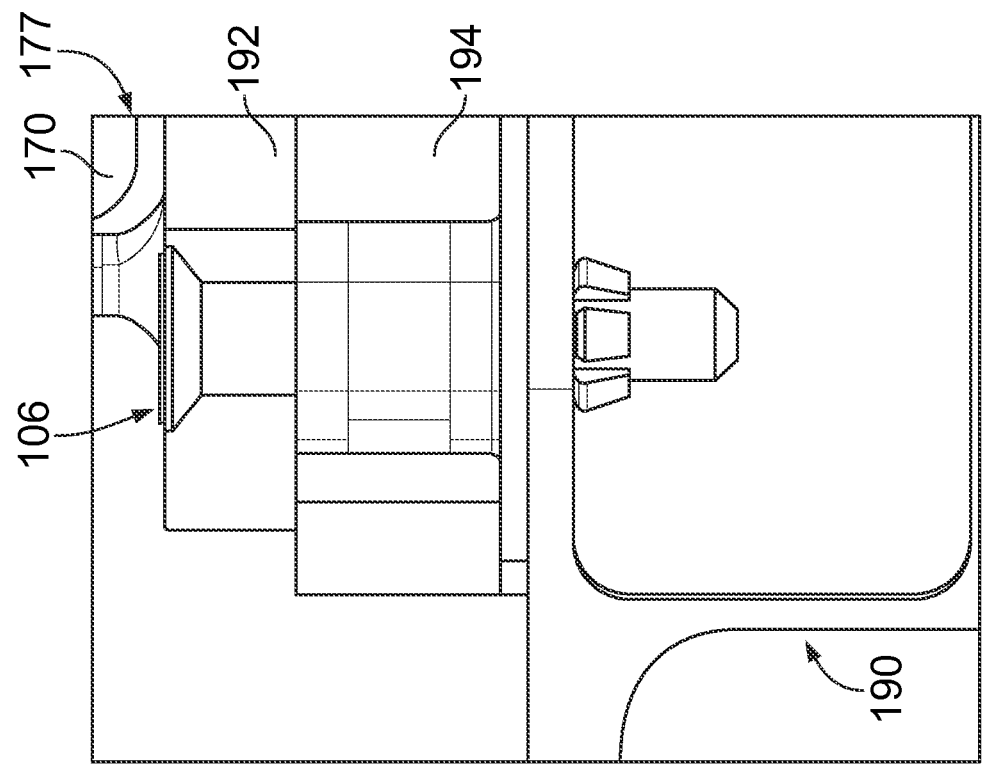
FIG. 9 illustrates a lower lateral view of the frame secured to a seat track, according to an example of the present disclosure.

FIG. 9 illustrates a lower lateral view of the frame 170 secured to a seat track 190, according to an example of the present disclosure. The seat track 190 extends longitudinally through a portion of the internal cabin. The seat track 190 is secured on and/or within a floor of the internal cabin. One or both lower corners 177 of the frame 170 can be secured to a fitting 192 that secures to the seat track 190 and floor panel 194 via one or more fasteners 196. Optionally, the frame 170 can be integrally formed and molded with a portion of the floor, instead of through seat track(s). As another example, the frame 170 can be secured to portions of the floor through fastener(s), adhesive(s), and/or the like.

Figure 10:
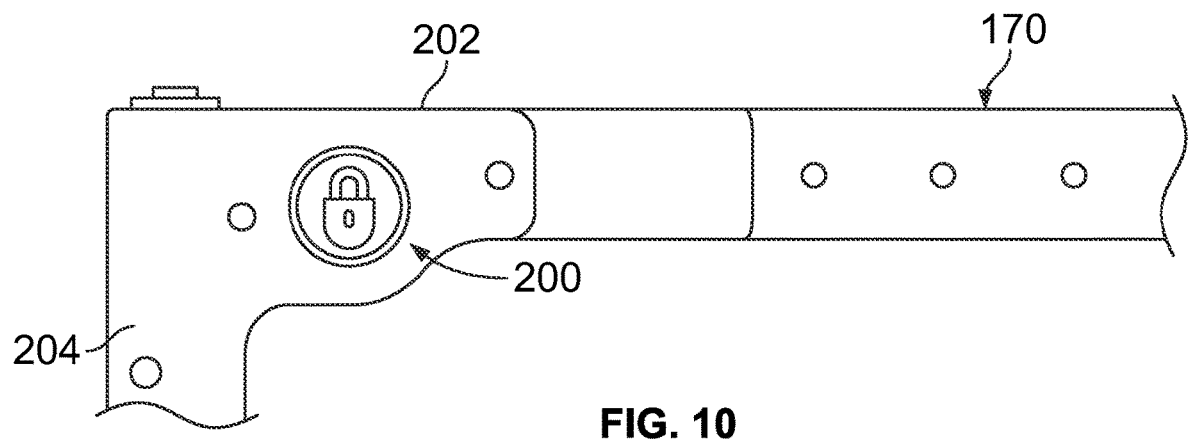
FIG. 10 illustrates a front view of an upper portion of the frame, according to an example of the present disclosure.

FIG. 10 illustrates a front view of an upper portion of the frame 170, according to an example of the present disclosure. FIG. 10 illustrates a portion of the frame 170 facing the vehicle control area 104 (shown in FIG. 1), although an opposite side can be similarly configured. The frame 170 can include one or more indicator lights 200, such as can be disposed on an upper cross beam 202 of the frame 170. Optionally, the indicator light(s) 200 can be disposed on a vertical column 204 of the frame 170. Optionally, the indicator light(s) 200 can be disposed directly on the second door 120. In at least one other example, each of the frame 170 and the second door 120 includes one or more indicator lights 200.

The indicator light(s) 200 can be on one or both front or rear surfaces of the frame 170. The indicator light(s) 200 are in wired or wireless communication with one or more latches, and are configured to emit different indicia (such as graphics, light emission, and/or the like) indicating a status of the second door 120 (not shown in FIG. 10), such as closed, open, locked, and/or unlocked.

Figure 11:
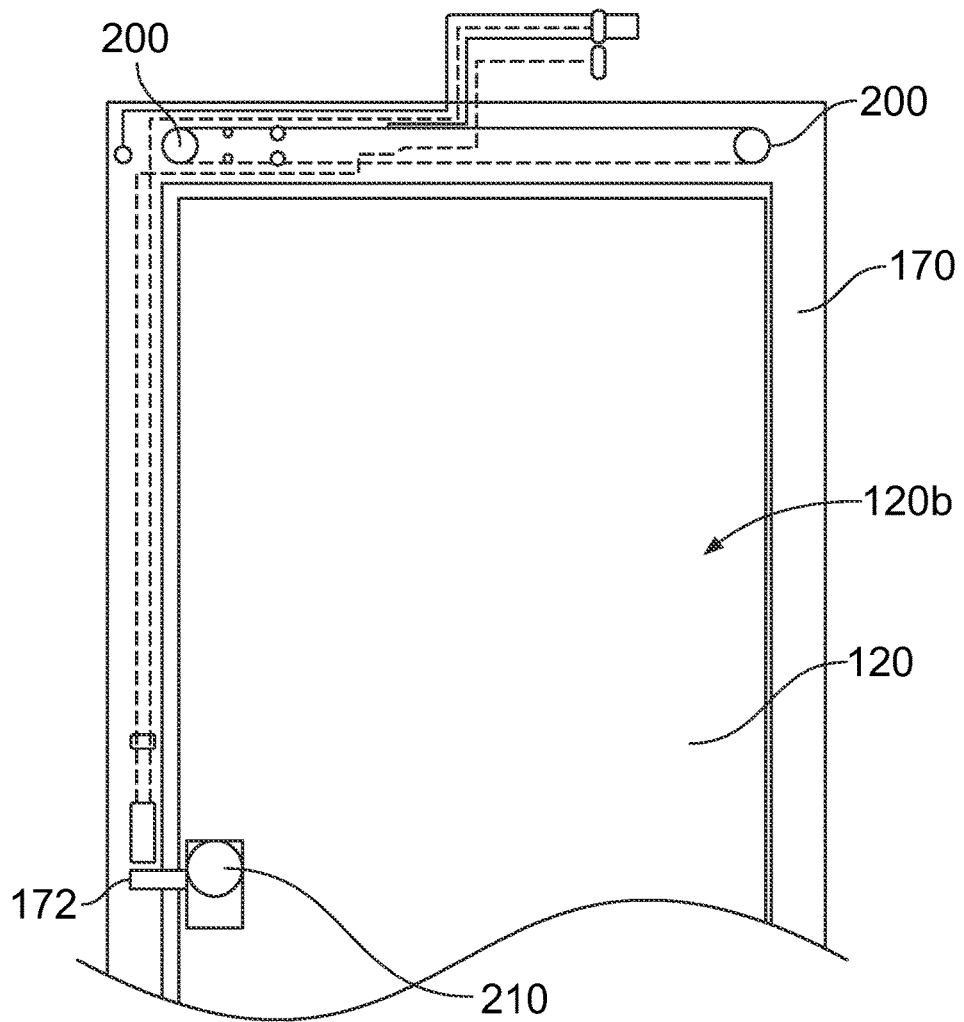
FIG. 11 illustrates a rear view of a second door in the closed position, according to an example of the present disclosure.

FIG. 11 illustrates a rear view of the second door 120 in the closed position 120b, according to an example of the present disclosure. FIG. 11 illustrates the second door 120 facing the passenger seating area 112 (shown in FIG. 1, for example). Optionally, the view shown in FIG. 11 can face the vehicle control area 104 (shown in FIG. 1, for example). The frame 170 can include two indicator lights 200, each of which is positioned at or proximate to an upper corner. In at least one example, the second door 120 includes a handle 210 that engages the latch 172, which is in communication with the indicator lights 200 through one or more wired or wireless connections. The latch 172 outputs signals to the indicator lights 200 indicative of a closed, locked, open, and/or unlocked position. The indicator lights 200 emit indicia, such as graphics or light emissions, based on the signals received from the latch 172. Alternatively, the frame 170 may not include an indicator light.

Figure 12:
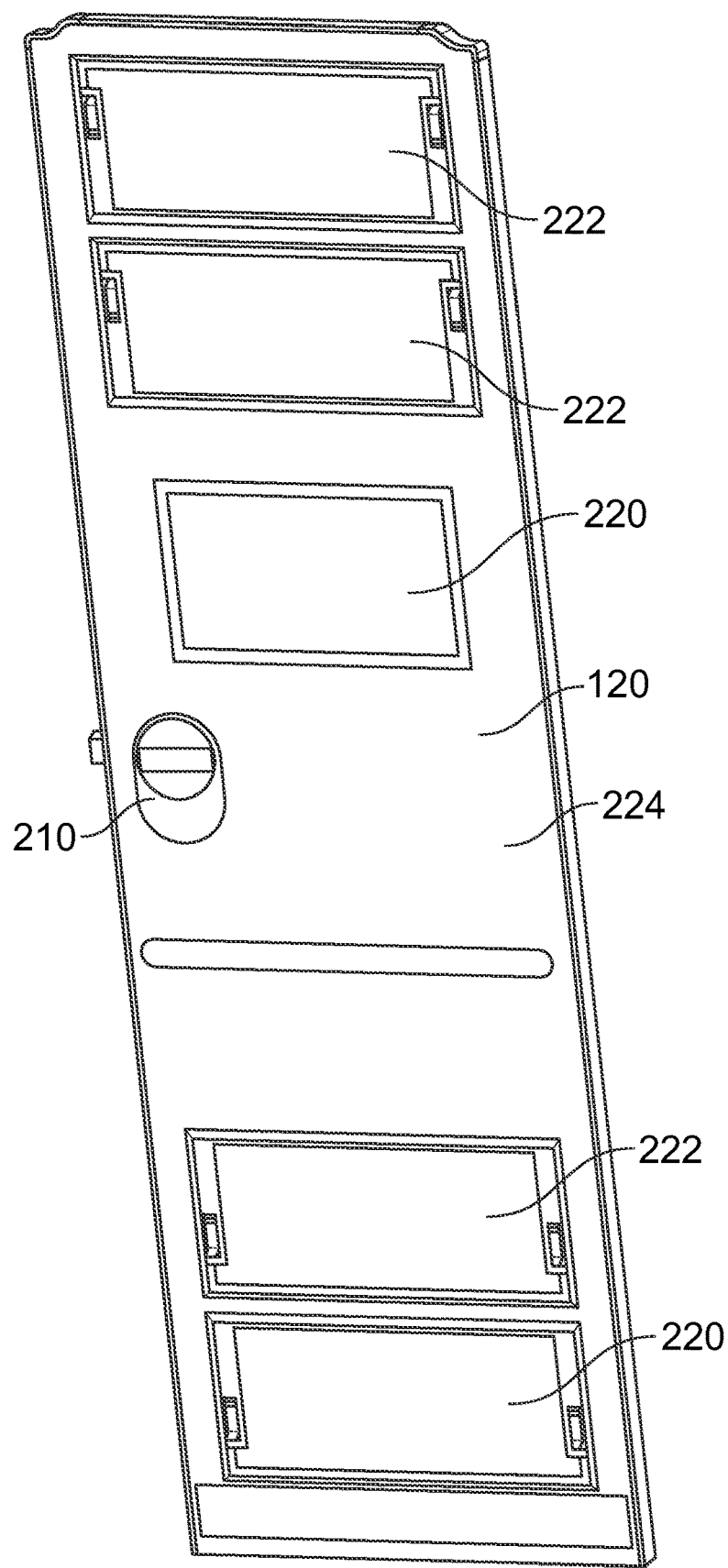
FIG. 12 illustrates an isometric rear view of the second door, according to an example of the present disclosure.
Figure 13:
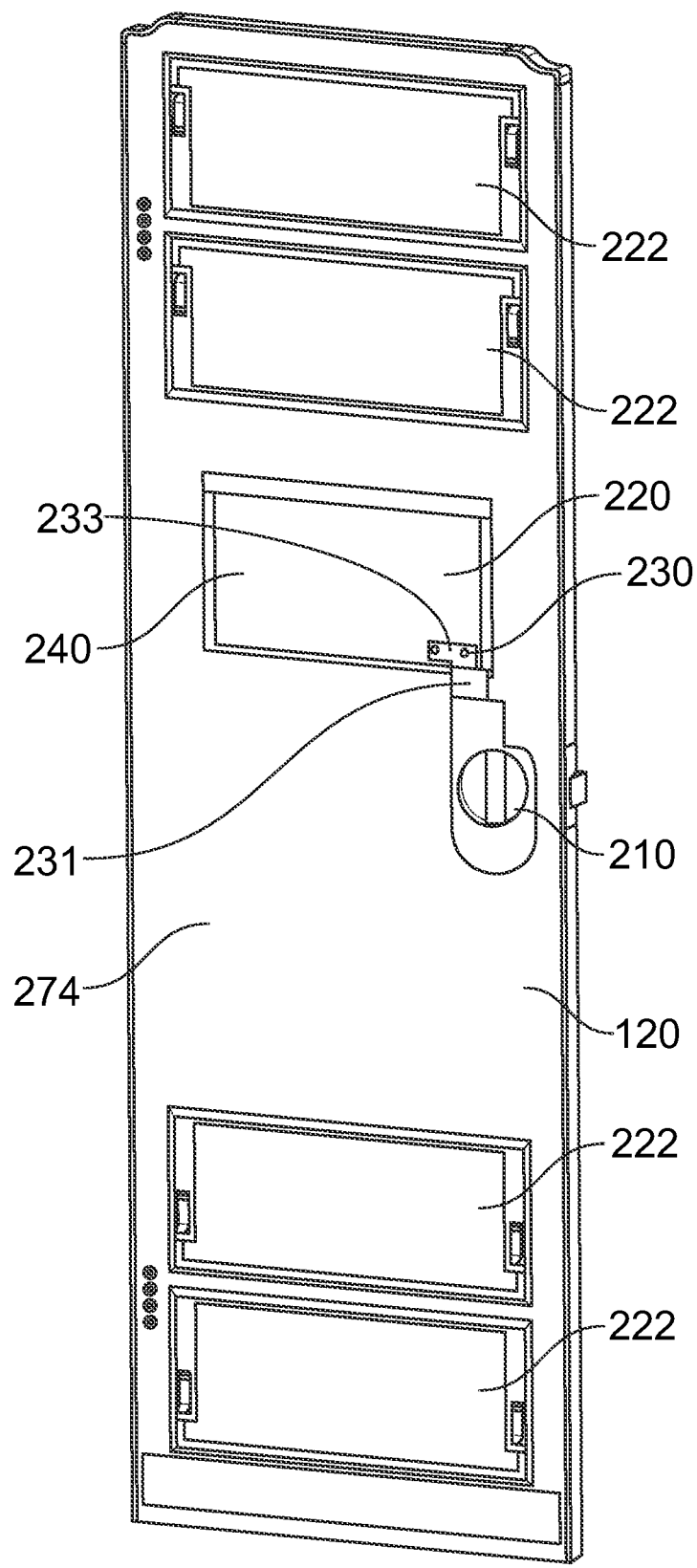
FIG. 13 illustrates an isometric front view of the second door shown in FIG. 12.
Figure 14:
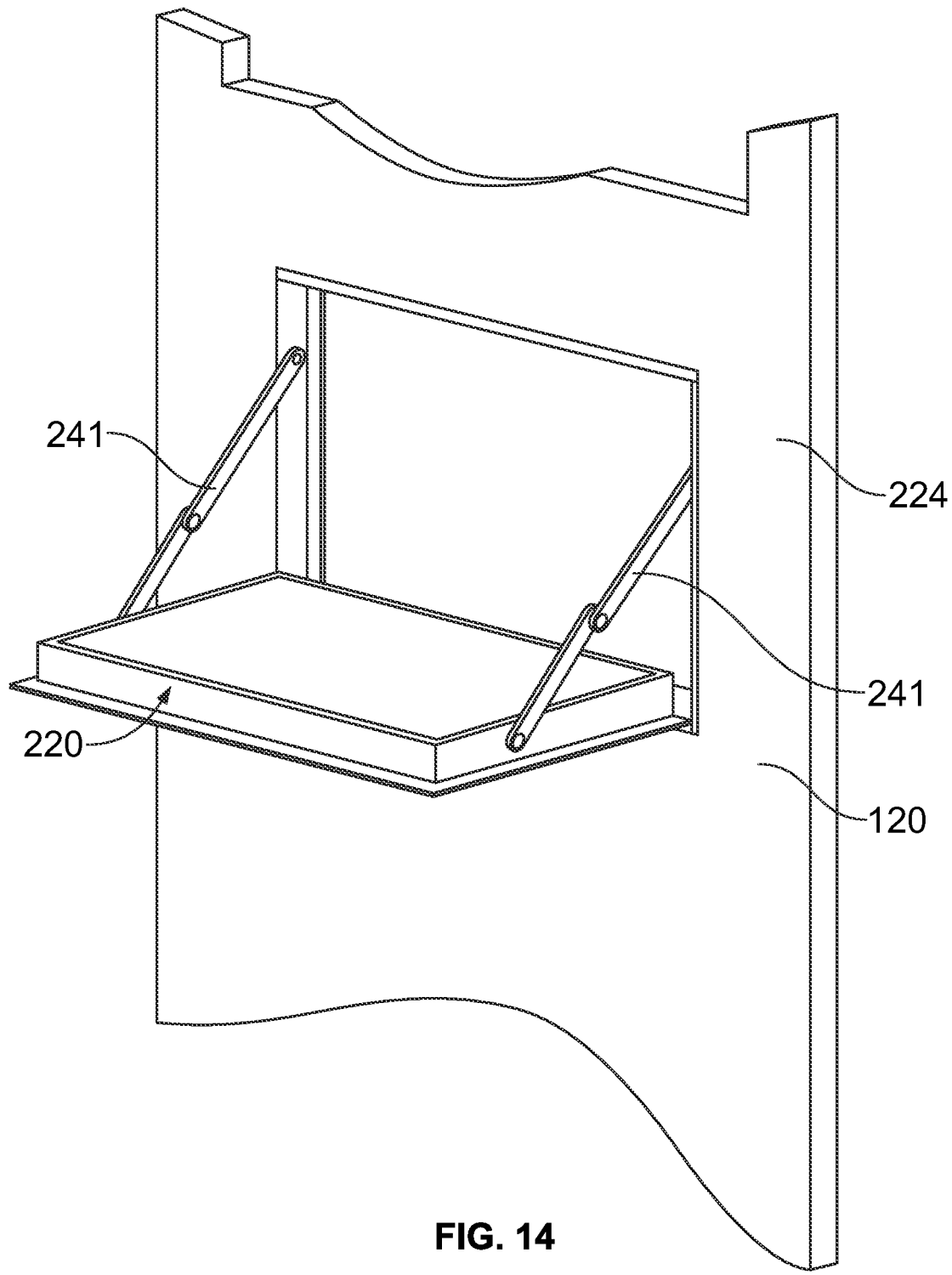
FIG. 14 illustrates a front view of an access panel in an open position, according to an example of the present disclosure.

FIG. 12 illustrates an isometric rear view (facing the passenger seating area 112 shown in FIG. 1) of the second door 120, according to an example of the present disclosure. FIG. 13 illustrates an isometric front view (facing the vehicle control area 104 shown in FIG. 1) of the second door 120 shown in FIG. 12. FIG. 14 illustrates a front view of an access panel 220 in an (access) open position, according to an example of the present disclosure. Referring to FIGS. 12-14, the second door 120 can include the access panel 220, and one or more decompression panels 222. Each of the access panel 220, and the decompression panels 222 are movable between open and closed positions.

Referring to FIGS. 1, 12, 13, and 14, the access panel 220 can be moved to the open position, so as to pass items between the privacy vestibule 122 and the rearward section 108b of the aisle 108 when the second door 120 is in the (access) closed position. The access panel 220 can be pivotally coupled to the main body 224 of the second door 120.

The access panel 220 can be opened, such as to deliver food and beverage items to the privacy vestibule 122. The front of the second door 120 includes a lock 230, such as a pivotal tab, that can be engaged from only the front side of the second door 120. The lock 230 can be rotated into an open position to allow the access panel 220 to be opened toward the vehicle control area 104 and supported on top of the lock 230. When the lock 230 is in the locked position, as shown in FIG. 13, the lock prevents the access panel 220 from being opened. The lock 230 can further include a plunger 231 that is configured to recede downwardly when engaged, to allow the lock to move downwardly into a position that allows a top of the pivotal tab 233 to support a front surface 240 of the access panel 220 in the open position. As shown in FIG. 14, the access panel 220 can also include lateral hinges 241 coupling to the main body 224 and/or an internal frame. In at least one example, the hinges 241 ensure that the access panel 220 does not open downwardly past a level orientation in relation to a floor of the internal cabin.

In at least one example, the lock 230 has a portion, such as the plunger 231 that engages a portion of the handle 210 when the access panel 220 is in the open position. The lock 230 engages the handle 210 to ensure that the handle 210 cannot be operated to open the second door 120 when the access panel 220 is in the open position. Further, the open access panel 220 extends over the handle 210 and the lock 230 on the front surface, thereby providing a barrier that prevents an individual from reaching the handle 210 or the lock 230 from outside of the privacy vestibule 122. Alternatively, the second door 120 may not include the access panel.

Figure 17:
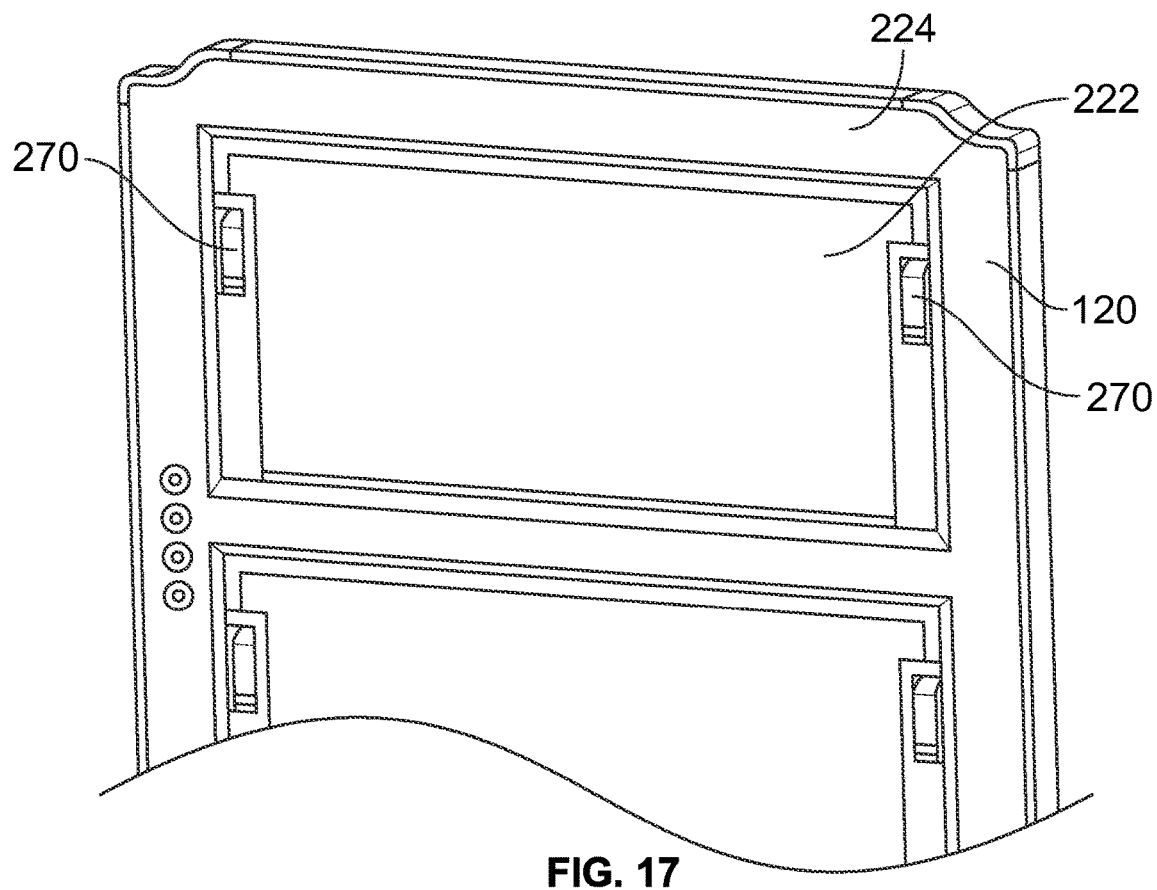
FIG. 17 illustrates a rear view of a decompression panel in a closed position, according to an example of the present disclosure.
Figure 18:
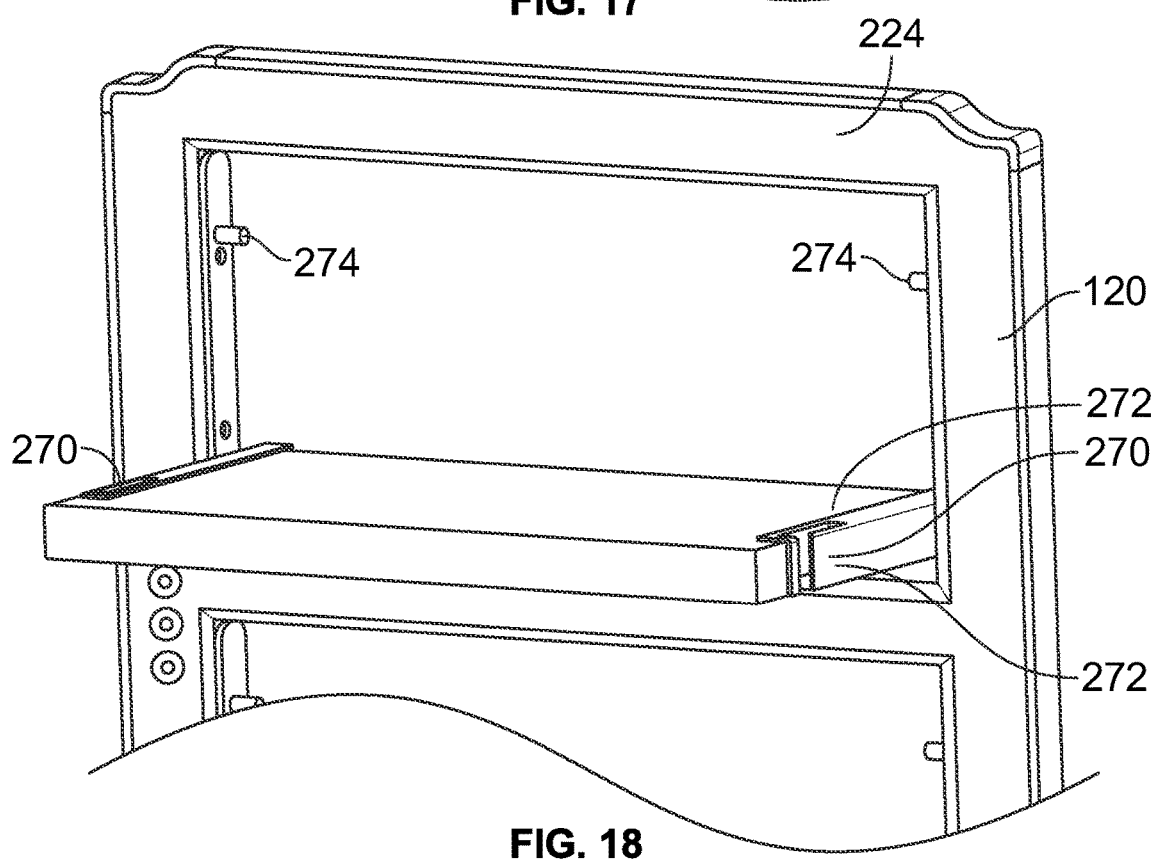
FIG. 18 illustrates a rear view of the decompression panel shown in FIG. 17 in an open position, according to an example of the present disclosure.

FIG. 15 illustrates a front view of the second door 120, according to an example of the present disclosure. FIG. 16 illustrates a lateral view of the second door 120 with decompression panels 222a and 222b in (decompression) open positions, according to an example of the present disclosure. FIG. 17 illustrates a rear view of a decompression panel 222 in a closed position, according to an example of the present disclosure. FIG. 18 illustrates a rear view of the decompression panel 222 shown in FIG. 17 in an open position, according to an example of the present disclosure. Referring to FIGS. 15-18, the second door 120 can include two upper decompression panels 222a and two lower decompression panels 222b. The access door 120 is disposed between the upper compression panels 222a and the lower decompression panels 222b. The second door 120 can include more or less decompression panels than shown. In at least one example, the second door 120 may not include decompression panels.

As shown, the upper decompression panels 222a can be configured to downwardly pivot in the direction of arrows B into open positions, while the lower decompression panels can be configured to upwardly pivot in the direction of arrows C into open positions. In the open positions, the decompression panels 222a and 222b provide decompression vents. The decompression panels 222a and 222b can be configured to open in response to a predetermined pressure exerted on the front surface of the second door 120.

In at least one example, each decompression panel 222a and 222b can be coupled to the main body 224 of the second door through one or more latch assemblies 270. Each latch assembly 270 can include a magnet 272, such as a Neodymium magnet, and a latch bolt 274 to allow two-way opening. An opening load for the decompression panels 222a and 222b can be a function of the resistance between the magnets 272 and the latch bolts 274. In an unperturbed state, the magnet 272, such as can be located in the center of the latch assembly 270, pulls the latch bolts 274 toward the magnet 272, thereby maintaining the decompression panel 222 in a (decompression) closed position. A load of a predetermined magnitude overcomes the magnetic force, thereby forcing the decompression panel 222 open. As shown, the decompression panels 222a and 222b are oriented vertically, and gravity does not interfere with panel opening or pressure loads. Stop blocks can be added to prevent the decompression panels 222a and/or 222b from over-rotation and/or rotating onto the handle 210, for example.

Figure 19:
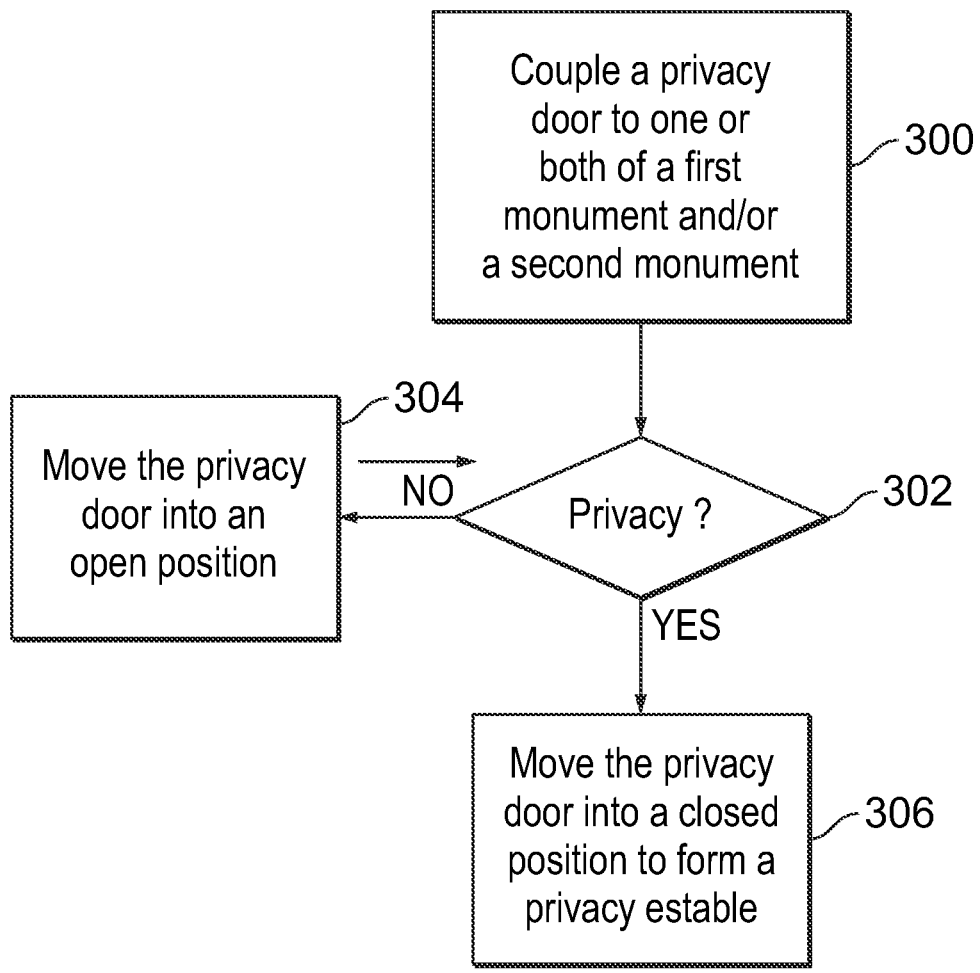
FIG. 19 illustrates a flow chart of a method, according to an example of the present disclosure.

FIG. 19 illustrates a flow chart of a method, according to an example of the present disclosure. Referring to FIGS. 1 and 19, at 300, a privacy door, such as the second door 120, is coupled to one or both of the first monument 110a and/or the second monument 110b. At 302, an individual, such as a member of a flight crew, determines whether privacy is desired at a forward portion of the vehicle 100. If not, the method proceeds from 302, to 304, at which the privacy door is moved into the open position, thereby allowing access to the first monument 110a, the second monument 110b, and the first door 106 by individuals within the passenger seating area 112. If, however, privacy is desired at 302, the method proceeds to 306, at which the privacy door is moved into the closed position to form the privacy vestibule 122.

Further, the disclosure comprises examples according to the following clauses:

Clause 1. An internal cabin of a vehicle comprising:
a vehicle control area;
a first door coupled to the vehicle control area, wherein the first door is moveable between a first open position and a first closed position;
a passenger seating area;
an aisle extending between the vehicle control area and the passenger seating area;
a first monument;
a second monument, wherein a forward section of the aisle is disposed between the first monument and the second monument; and
a second door disposed within the aisle between the first monument and the second monument, wherein the second door is moveable between a second open position and a second closed position, and wherein a privacy vestibule is defined between the second door in the second closed position, the first monument, the second monument, and the vehicle control area.

Clause 2. The internal cabin of Clause 1, wherein each of the first monument and the second monument is one of a lavatory, a galley, a closet, a crew rest area, or one or more walls.

Clause 3. The internal cabin of Clauses 1 or 2, wherein the privacy vestibule is in front of a rearward section of the aisle that extends into a passenger seating area.

Clause 4. The internal cabin of any of Clauses 1-3, wherein the second door is configured to pivot between the second open position and the second closed position.

Clause 5. The internal cabin of any of Clauses 1-4, wherein the second door is further moveable into a rearward position that differs from the second open position and the second closed position.

Clause 6. The internal cabin of any of Clauses 1-5, further comprising a latch coupled to one or both of the first monument or the second monument, wherein the latch is configured to couple to a portion of the second door in the second open position to secure the second door in the second open position.

Clause 7. The internal cabin of Clause 6, wherein the second door comprises a locking mechanism configured to cooperate with the latch.

Clause 8. The internal cabin of any of Clauses 1-7, further comprising a frame coupled to one or both of the first monument or the second monument, wherein the second door is moveably coupled to the door frame.

Clause 9. The internal cabin of Clause 8, wherein the frame is secured to one or more seat tracks.

Clause 10. The internal cabin of Clauses 8 or 9, wherein one or both of the second door or the frame comprises one or more indicator lights indicating a status of the second door.

Clause 11. The internal cabin of any of Clauses 1-10, wherein the second door comprises an access panel configured to be moveable between an access closed position and an access open position.

Clause 12. The internal cabin of Clause 11, wherein the second door cannot be moved from the second closed position to the second open position when the access panel is in the access open position.

Clause 13. The internal cabin of any of Clauses 1-12, wherein the second door comprises one or more decompression panels moveable between a decompression closed position and a decompression open position.

Clause 14. The internal cabin of Clause 13, wherein the one or more decompression panels comprise one or more latch assemblies including one or more magnets and one or more latch bolts.

Clause 15. A method, comprising:
moving a first door coupled to a vehicle control area between a first open position and a first closed position, wherein an aisle extends between the vehicle control area and a passenger seating area, and wherein a forward section of the aisle is disposed between a first monument and a second monument; and
moving a second door within the aisle between a second open position and a second closed position, and wherein a privacy vestibule is defined between the second door in the second closed position, the first monument, the second monument, and the vehicle control area.

Clause 16. A privacy door for an internal cabin of a vehicle, the privacy door comprising:
a main body moveably coupled to one or both of a first monument or a second monument, wherein the main body is moveable between an open position and a closed position, and wherein the main body in the closed position provides a privacy vestibule between the privacy door, the first monument, the second monument, and a vehicle control area.

Clause 17. The privacy door of Clause 16, wherein the main body is further moveable into a rearward position that differs from the open position and the closed position.

Clause 18. The privacy door of Clauses 16 or 17, wherein the main body is coupled to one or both of the first monument or the second monument by a frame, wherein the privacy door is moveably coupled to the door frame.

Clause 19. The privacy door of Clause 18, wherein one or both of the second door or the frame comprises one or more indicator lights indicating a status of the second door.

Clause 20. The privacy door of any of Clauses 16-19, further comprising:
an access panel configured to be moveable between an access closed position and an access open position; and
one or more decompression panels moveable between a decompression closed position and a decompression open position.

As described herein, examples of the subject disclosure provide an expanded resting area for flight crew within an internal cabin of an aircraft. Further, example so the present disclosure provide additional private space within an internal cabin of an aircraft. Such space can be selectively converted between the privacy vestibule 122, and an open area that is exposed to the passenger seating area 112.

While various spatial and directional terms, such as top, bottom, lower, mid, lateral, horizontal, vertical, front and the like can be used to describe examples of the subject disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An internal cabin of a vehicle comprising:
a vehicle control area;
a first door coupled to the vehicle control area, wherein the first door is moveable between a first open position and a first closed position;
a passenger seating area;
an aisle extending between the vehicle control area and the passenger seating area;

a first monument; a second monument, wherein a forward section of the aisle is disposed between the first monument and the second monument, wherein one or both of the first monument or the second monument comprises a monument door moveable between a monument open position and a monument closed position, and wherein one or both of the first monument or the second monument is accessible when the monument door is in the monument open position; and a second door disposed within the aisle between the first monument and the second monument, wherein the second door is moveable between a second open position and a second closed position, and wherein a privacy vestibule is defined between the second door in the second closed position, the first monument, the second monument, and the vehicle control area, wherein the second door comprises:

an access panel moveable between an access closed position and an access open position; and one or more decompression panels moveable between a decompression closed position and a decompression open position, wherein the second door cannot be moved from the second closed position to the second open position when the access panel is in the access open position and engages a locking mechanism with a handle on the second door.

2. The internal cabin of claim 1, wherein each of the first monument and the second monument is one of a lavatory, a galley, a closet, a crew rest area, or one or more walls.

3. The internal cabin of claim 1, wherein the privacy vestibule is in front of a rearward section of the aisle that extends into a passenger seating area.

4. The internal cabin of claim 1, wherein the second door is configured to pivot between the second open position and the second closed position.

5. The internal cabin of claim 1, wherein the second door is further moveable into a rearward position that differs from the second open position and the second closed position, and wherein the rearward position is past the closed position, and 180 degrees opposite from the open position.

6. The internal cabin of claim 1, further comprising a latch coupled to one or both of the first monument or the second monument, wherein the latch is configured to couple to a portion of the second door in the second open position to secure the second door in the second open position.

7. The internal cabin of claim 6, wherein the locking mechanism is configured to cooperate with the latch.

8. The internal cabin of claim 1, further comprising a frame coupled to one or both of the first monument or the second monument, wherein the second door is moveably coupled to the door frame, wherein the frame comprises:

spring-loaded pins extending from an upper surface, wherein the spring-loaded pins are received and retained by reciprocal fittings of secondary structure within the internal cabin.

9. The internal cabin of claim 8, wherein the frame further comprises fittings extending from a lower surface, wherein the fittings are secured to seat tracks on a floor of the internal cabin.

10. The internal cabin of claim 8, wherein one or both of the second door or the frame comprises one or more indicator lights indicating a status of the second door.

11. The internal cabin of claim 1, wherein the one or more decompression panels comprise one or more latch assemblies including one or more magnets and one or more latch bolts.

12. A method, comprising:

moving a first door coupled to a vehicle control area between a first open position and a first closed position, wherein an aisle extends between the vehicle control area and a passenger seating area, and wherein a forward section of the aisle is disposed between a first monument and a second monument, wherein one or both of the first monument or the second monument comprises a monument door moveable between a monument open position and a monument closed position, and wherein one or both of the first monument or the second monument is accessible when the monument door is in the monument open position; and moving a second door within the aisle between a second open position and a second closed position, and wherein a privacy vestibule is defined between the second door in the second closed position, the first monument, the second monument, and the vehicle control area, wherein the second door comprises:

an access panel moveable between an access closed position and an access open position; and one or more decompression panels moveable between a decompression closed position and a decompression open position, wherein the second door cannot be moved from the second closed position to the second open position when the access panel is in the access open position and engages a locking mechanism with a handle on the second door.

13. A privacy door for an internal cabin of a vehicle, the privacy door comprising:

a main body moveably coupled to one or both of a first monument or a second monument, wherein one or both of the first monument or the second monument comprises a monument door moveable between a monument open position and a monument closed position, wherein one or both of the first monument or the second monument is accessible when the monument door is in the monument open position, wherein the main body is separate and distinct from the monument door, wherein the main body is moveable between an open position and a closed position, wherein the main body in the closed position provides a privacy vestibule between the privacy door, the first monument, the second monument, and a vehicle control areal an access panel secured to the main body, the access panel moveable between an access closed position and an access open position; and one or more decompression panels secured to the main body, the one or more decompression panels moveable between a decompression closed position and a decompression open position, wherein a second door cannot be moved from a second closed position to a second open position when the access panel is in the access open position and engages a locking mechanism with a handle on the second door.

14. The privacy door of claim 13, wherein the main body is further moveable into a rearward position that differs from the open position and the closed position, and wherein the rearward position is past the closed position, and 180 degrees opposite from the open position.

15. The privacy door of claim 13, wherein the main body is coupled to one or both of the first monument or the second monument by a frame, wherein the privacy door is moveably coupled to the door frame, wherein the frame comprises:

spring-loaded pins extending from an upper surface, wherein the spring-loaded pins are received and retained by reciprocal fittings of secondary structure within the internal cabin; and fittings extending from a lower surface, wherein the fittings are secured to seat tracks on a floor of the internal cabin.

16. The privacy door of claim 15, wherein one or both of the main body or the frame comprises one or more indicator lights indicating a status of the second door.

17. The internal cabin of claim 1, wherein the first door is separate and distinct from the monument door, and wherein the second door is separate and distinct from the monument door.

18. The internal cabin of claim 1, wherein the one or more decompression panels comprise an upper decompression panel and a lower decompression panel, wherein the access panel is disposed below the upper decompression panel, and above the lower decompression panel.

19. The internal cabin of claim 1, wherein the second door further comprises a lock moveable between a lock open position and a locked position, wherein the access panel in the access open position is supported on top of the lock in the lock open position, and wherein the lock in the locked position prevents the access panel in the access closed position from being opened.

20. The internal cabin of claim 19, wherein the lock comprises a plunger configured to recede downwardly to allow the lock to moved downwardly into a position that allows a top of a pivotal tab to support a front surface of the access panel in the access open position.

21. The privacy door of claim 13, wherein the one or more decompression panels comprise an upper decompression panel and a lower decompression panel, wherein the access panel is disposed below the upper decompression panel, and above the lower decompression panel.

* * * * *